United States Patent [19]

Bettacchi et al.

[11] Patent Number: 4,981,521

[45] Date of Patent: Jan. 1, 1991

[54] SPRAYABLE FIREPROOFING COMPOSITION

[75] Inventors: Robert J. Bettacchi, Lexington; Mary Driscoll, Arlington, both of Mass.; Dennis M. Hilton, London Derry, N.H.

[73] Assignee: W. R. Grace & Co.-Conn., Lexington, Mass.

[21] Appl. No.: 192,011

[22] Filed: May 9, 1988

[51] Int. Cl.$^5$ ............ C04B 14/10; C04B 11/00; C04B 14/42

[52] U.S. Cl. ............ 106/811; 106/812; 106/676; 106/677; 106/678; 106/694; 106/711; 106/719; 106/720; 106/774

[58] Field of Search ............ 106/115, 109, 110, 18.12, 106/75, 87, 99, 676, 677, 678, 694, 711, 719, 720, 774

[56] References Cited

U.S. PATENT DOCUMENTS

| | | | |
|---|---|---|---|
| 2,703,289 | 3/1955 | Willson | 106/93 |
| 2,880,102 | 3/1959 | Woodard et al. | 106/90 |
| 3,098,754 | 7/1963 | Dixon | 106/88 |
| 3,353,975 | 11/1967 | Shannon et al. | 106/95 |
| 3,616,173 | 10/1971 | Green | 161/162 |
| 3,719,513 | 3/1973 | Bragg et al. | 106/114 |
| 3,839,050 | 10/1974 | Rothfelder et al. | 106/115 |
| 3,852,083 | 12/1974 | Yang | 106/115 |
| 4,159,302 | 1/1979 | Greve et al. | 264/333 |
| 4,395,456 | 7/1983 | Jackson et al. | 428/304.4 |
| 4,547,469 | 10/1985 | Jackson et al. | 501/84 |

FOREIGN PATENT DOCUMENTS

| | | | |
|---|---|---|---|
| 2547908 | 4/1977 | Fed. Rep. of Germany | |
| 57-129856 | 8/1982 | Japan | 106/109 |

OTHER PUBLICATIONS

Harry D. Foster, "Manufacture of Lightweight Products", Bulletin of the American Ceramic Society, vol. 19, No. 12 (1940).

Sybil P. Parker, editor-in-chief; McGraw-Hill Dictionary of Scientific & Technical Terms, 3rd Edition, 1984, p. 575.

Paul W. Thrush, editor; A Dictionary of Mining, Mineral & Related Terms, 1968, pp. 400 and 641.

Primary Examiner—William R. Dixon, Jr.
Assistant Examiner—Anthony J. Green
Attorney, Agent, or Firm—Celia H. Ketley; William L. Baker; Jack Wasatonic

[57] ABSTRACT

Fire retardant coatings for metal structural members are obtained by spraying onto the structural members settable plaster compositions which are air-containing pumpable aqueous slurries of plaster, clay prill aggregate, cellulose and glass fiber reinforcement and foaming agent. The specially prepared clay prill aggregate has a low aspect ratio of near unity and is an acceptable substitute for the exfoliated vermiculite aggregate of prior coating compositions.

12 Claims, No Drawings

SPRAYABLE FIREPROOFING COMPOSITION

BACKGROUND OF THE INVENTION

In the course of erecting steel structures such as multi-story buildings, a thick coating of a fireproofing material is commonly applied to metallic structural elements. While several types of formulations have been applied for this purpose over the years by means of a variety of techniques, the most successful system so far consists of spraying onto the steel surfaces settable aqueous mixes composed essentially of calcined gypsum, a lightweight inorganic aggregate material of exfoliated vermiculite, a mixture of fibrous materials such as a high wet bulking cellulosic fiber and glass fiber, and an air entraining agent. A composition of this type is described by Bragg in U.S. Pat. Nos. 3,719,573 and 3,839,059, along with the most desirable application technique, i.e., pumping the aqueous mix and spraying it directly onto the steel.

In order to be suitable for such use, coating mixes, both in the wet and set state, must possess a number of crucial properties. They must be able to hold the large quantity of water that renders them capable of being pumped easily and to great heights, yet they must retain a consistency sufficient to prevent segregation or settling of ingredients during pumping and permit adequate "yield" or coverage of the steel surface at a given thickness. The coating mixes, furthermore, must adhere to steel surfaces, both in the slurried state and in the dry state as well as during a fire. Also, the mix must have a controlling set without exhibiting undue shrinkage which could result in the formation of cracks that would seriously diminish the insulative value of the dry coating.

As intimated earlier, this complex balance of properties has substantially been achieved heretofore by aqueous mixes containing gypsum binder, expanded (exfoliated) vermiculite aggregate and cellulosic fiber. These aqueous mixes can be pumped to great heights and spray applied as an up to ¾ inch thick coating in a single pass. As the coating sets further layers can be applied thereover.

Exfoliated vermiculite possesses a number of qualities which make it attractive for use as an aggregate in pumpable, settable fireproofing plasters. For example, such vermiculite is of relatively low density and thus remains suspended in the fireproofing slurry. Air trapped within the vermiculite contributes to its good insulating characteristics. Further, the irregular shape and surface contour of each vermiculite particle is believed to trap water as well as the cellulosic and optional glass fibrous components thus aiding the maintenance of a homogeneous slurry.

There has been a need and motivation in the art to formulate new spray applied fireproofing compositions which satisfactorily employ aggregates other than vermiculite while providing the diverse mix of properties referred to above. As described, this need has now been met.

SUMMARY OF THE INVENTION

In accordance with this invention, it has been found that sprayable cementitious compositions including specially prepared clay prills as a lightweight aggregate can be prepared and utilized as spray applied fireproofing compositions for structural steel members. It has been found that these compositions can be prepared as pumpable, sprayable materials which maintain a uniform consistency, without segregation of the aggregate, throughout the pumping operations and after application to the steel. Upon spray application to the steel members, the slurries provide a high yield and display satisfactory adhesion in both the slurried and set state. The adhered compositions provide excellent fire and heat insulative protection to the steel. Surprisingly, the present fireproofing compositions are easier to pump (i.e., they generate lower pump backpressures) than their vermiculite-containing counterparts.

Although inorganic materials, in a variety of physical forms, have heretofore been proposed for use in heat insulating compositions, we have found the above mentioned properties that are crucial to a pumpable plaster are not easily achieved. For example, many tested aggregates consistently segregate within the desired aqueous slurries and thus cannot be satisfactorily applied in commercial settings. Other, low strength aggregates cannot survive the rigors of pumping and spray application; they break and crumble and thus reduce both yield and the physical properties for which they are relied upon.

The present invention is accordingly directed to settable, pumpable and sprayable fireproofing compositions, capable of adherence to steel structural members in the slurried and set state, comprising a hydratable binder, clay prills as hereinafter described, an air entraining (foaming) agent, and fibrous component(s). The invention is further directed to fireproofed steel structural members coated with the fireproofing compositions of this invention.

DETAILED DESCRIPTION OF THE INVENTION

The lightweight aggregate used in the present compositions is a high strength clay prill particle. Clay prills are generally described and defined in U.S. Pat. Nos. 4,395,456 and 4,547,469 (both to G. V. Jackson et al) which are incorporated by reference herein. These prills are pieces of inorganic foam of cellular structure and are comprised of one or more layer minerals. As described in the Jackson et al patents, the prills are produced by gasifying a suspension of minerals (e.g. clays) in a liquid medium, shaping the gasified suspension and then removing the liquid medium (i.e. drying) to provide a void-containing product. We have found that subsequent to drying the prills must be fired under certain conditions as described herein in order to produce an aggregate of sufficient strength.

Our experimental work has shown that in order to provide a fireproofing product which exhibits good pumping qualities (little or no segregation or clogging of the spray application equipment, e.g., hoses and valves), good adherence to steel structural members in the desired up to ¾ inch per pass thickness and good fireproofing qualities, the clay prill particles should have a low aspect ratio (i.e., ratio of length divided by diameter), preferably an aspect ratio of about 3:1 to 1:1, fall within a particular size distribution and be strong enough to resist breakage or crumbling during transport, mixing, pumping and impacting steel structural members during spray application. Prills produced according to the formulas and procedures taught by the Jackson et al patents failed to meet one or more of these requirements. The following discussion summarizes the important prill characteristics:

Geometry:

We have found that clay prills of essentially spherical shape, i.e., having low aspect ratio, provide a pumpable slurry that remains homogeneous when pumped to great heights and then sprayed. While the shape of each individual clay prill need not be identical to the shape of the next, we have found that good results are achieved when virtually all of the prills have an aspect ratio of about 3 or less and virtually none of the prills have an aspect ratio of about 5 or more. By comparison, cylindrical prills having a higher aspect ratio, when incorporated into a fireproofing slurry, caused segregation of the mixture, clogging of pumping equipment, high pump back pressure and thus were unacceptable.

The fact that low aspect ratio (essentially spherical) prills pump much easier than higher aspect ratio prills is surprising in that, by comparison, vermiculite of aspect ratio of about 3 to 5 or even greater is preferred over lower aspect ratio vermiculite in terms of pumpability.

Particle Size and Distribution:

Clay prills which will pass through No. 8 mesh screen are preferred. Larger prills tend to jam existing commercial pumping equipment and thus are unsatisfactory. In our most preferred size distribution prills pass through a No. 8, yet are retained by a No. 40, mesh screen. For a definition of screen sizes see ASTM Standard E-11 (1981 revision).

Strength:

As a general principal, the clay prill aggregate must be strong enough to withstand the rigors of pumping and spray application. Clay prills are physically unlike vermiculite which is more elastic than the former. Prills of insufficient strength produce powdery clay "fines" which reduce the yield of the slurry. We have found that an oxygen-rich kiln atmosphere promotes the production of high-strength prills.

The fireproofing composition of the invention preferably comprises from about 20 to about 50 weight % of the above-described clay prill aggregate.

EXAMPLE

A pumpable clay prill aggregate was prepared by first slurrying a mixture of 150 lbs. (68.2 kg) ball clay, 135 lbs (61.4 kg) tap water and 1.05 lbs (0.5 kg) sodium tripoly phosphate. A pre-reacted surfactant solution of the following formula was added to and mixed with the clay slurry: 0.899 lbs (0.409 kg) n-octylamine, 0.778 lbs (0.358 kg) phosphoric acid and 15 lbs (6.8 kg) tap water. The resultant material was foamed in a Goodway foamer to a wet density of about 0.2 g/ml and passed through an extrusion manifold having circular shaped orifices and onto a belt drier. The dry extrudate was broken into essentially spherical discreet particles in a Stokes granulator using a No. 4 mesh screen. The resulting product was fed to a vibratory screen where particles of the desired mesh size (−8, +40) were isolated.

The resulting dried clay prills were fired in a rotary kiln in an oxygen rich atmosphere at approx. 1000° C. for approximately three minutes until the product took on a bright white color. In the absence of sufficient oxygen, an off-white, grey or black color is taken on by the prills, thus indicating that the prills will be of insufficient strength. The fired prills had a density of approximately 3 to 15 pounds per cubic foot.

A settable fireproofing plaster composition was prepared by dry mixing the following ingredients:

|  |  |  | % by weight |
| --- | --- | --- | --- |
| calcined gypsum | 700 | lbs. | 62% |
| clay prills | 360 | lbs. | 32% |
| cellulosic fiber | 62.4 | lbs | 5.5% |
| AOS surfactant | 1.5 | lbs | 0.1% |
| glass fiber | 3.9 | lbs. | 0.3% |

The cellulosic fiber used in this preparation is preferably a high bulk cellulose fiber manufactured from waste newsprint paper by hammermill processing. The particle size distribution is such that less than about one percent is retained on a No. 4 mesh screen. Preferably about 4 to 7 percent by weight, based on the weight of the dry fireproofing mix, of cellulosic fiber is incorporated in the mix. Other cellulosic fibers of similar size, such as purified unbleached softwood cellulose, are useful. The glass fiber preferably is a chopped glass fiber of ¼ inch length and 6.5 micron diameter. From 0 to about 0.35 percent by weight of glass continuous filament is preferred.

Calcined gypsum is a preferred hydratable binder, but those skilled in the art will realize that other binders, including portland cement, prove satisfactory. We prefer the dry mix to contain about 45 to 75 percent by weight of hydratable binder.

Foaming or air-entraining agents, e.g. surfactants, useful in the present invention are well known and are employed in effective amounts. Preferred are the sodium alpha olefin sulfonates (AOS). Sodium alkyl sulfonates such as sodium lauryl sulfonate (SLS) also are useful.

At the point of use, the dry mixture just described is thoroughly mixed with water and is sufficiently agitated, or otherwise aerated, to provide a slurry of the proper consistency which can then be pumped through spray application apparatus for direct spraying onto metal surfaces. "Plastering pumps" well known to those in this art are employed to pump the slurry to the point of spray application.

Although the invention has been described in connection with certain preferred embodiments, it is not so limited. Modifications within the scope of the appended claims will be apparent to those skilled in the art.

We claim:

1. A fireproofing composition, capable of yielding a pumpable, sprayable, and settable slurry on addition of water, comprising hydratable, settable binder, a fibrous component, an air entraining agent, and clay prill aggregate formed by gasifying a suspension of one or more layer minerals in a liquid medium, shaping the resulting gasified suspension, and firing the shaped gasified suspension to sinter it.

2. A composition of claim 1 comprising about 45 to about 75 weight % of hydratable binder, about 4 to about 7 weight % of fibrous component, about 20 to about 50 weight % of clay prill aggregate and sufficient air entraining agent to provide a homogeneous foamed slurry.

3. A composition of claim 1 wherein said hydratable binder comprises gypsum.

4. A composition of claim 1 wherein said hydratable binder comprises portland cement.

5. A composition of claim 1 wherein said fibrous component comprises cellulosic fiber.

6. A composition of claim 1 wherein said fibrous component comprises chopped glass continuous filament.

7. A composition of claim 5 wherein said fibrous component comprises chopped glass continuous filament and cellulosic fiber.

8. A composition of claim 1 wherein said clay prill aggregate comprises substantially spherical clay prills.

9. A composition of claim 8 wherein substantially all of said clay prills are of (−8) mesh size.

10. A composition of claim 8 wherein said clay prills are of aspect ratio of about 3:1 to 1:1.

11. A composition of claim 8 wherein said clay prills are of approximately 3 to 15 pounds per cubic foot density.

12. A sprayable, settable fireproofing plaster slurry comprising, on a dry weight basis, 62% of gypsum, 32% of low aspect ratio clay prills formed by gasifying a suspension of one or more layer minerals in a liquid medium, shaping the resulting gasified suspension, and firing the shaped gasified suspension to sinter it, 5.5% cellulosic fiber, 0.3% glass fiber and 0.1% sodium alpha olefin sulfonate air entraining agent, admixed with sufficient water to provide a pumpable and sprayable slurry.

* * * * *